Jan. 8, 1963     H. H. CHEN     3,072,737
POLYGLYCIDYL ETHER AND ELECTRICAL CONDUCTOR
INSULATED THEREWITH
Filed Aug. 4, 1960

WITNESSES:
Bernard R. Gieguey
James F. Young

INVENTOR
Harold H. Chen
BY Charles S. Board
ATTORNEY

United States Patent Office

3,072,737
Patented Jan. 8, 1963

3,072,737
POLYGLYCIDYL ETHER AND ELECTRICAL CONDUCTOR INSULATED THEREWITH
Harold H. Chen, Oakland, Calif., assignor to Westinghouse Electric Corporation, East Pittsburgh, Pa., a corporation of Pennsylvania
Filed Aug. 4, 1960, Ser. No. 46,631
11 Claims. (Cl. 174—110)

This invention relates to nitrogen coordinated boron compounds and to the method of preparing same. This invention relates further to a process for curing glycidyl polyethers with the nitrogen coordinated boron compounds, and the products produced thereby.

The object of this invention is to provide nitrogen coordinated boron compounds derived from the reaction of monoalkanolamines and certain boron compounds.

Another object of this invention is to provide a method of producing nitrogen coordinated boron compounds by the reaction of monoalkanolamines and certain boron compounds.

A further object of this invention is to provide mixtures of glycidyl polyethers and curing catalysts comprising nitrogen coordinated boron compounds, which mixtures are stable for prolonged periods at room temperature and will react readily at elevated temperatures to provide cured resinous products.

An additional object of this invention is to provide a process for curing glycidyl polyethers by heating the same at elevated temperatures in the presence of a curing catalyst comprising a nitrogen coordinated boron compound.

A still further object of this invention is to provide electrical members insulated with a resinous composition comprising the cured product obtained by heating a mixture comprising at least one glycidyl polyether and a curing catalyst comprising a nitrogen coordinated boron compound.

Other objects of this invention will, in part, be obvious and will, in part, appear hereinafter.

Figure 1:
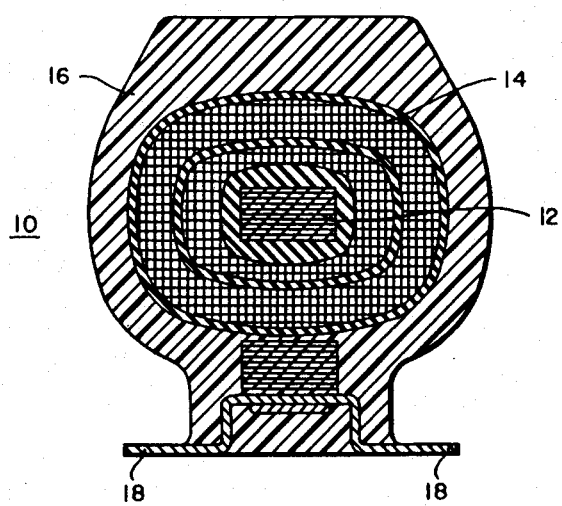
Figure 2:
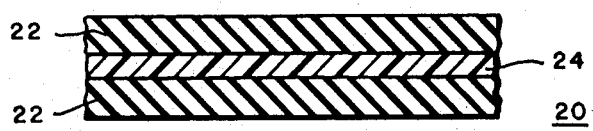

For a complete understanding of the nature and the objects of this invention, reference is made to the following detailed description and drawing, in which:

FIG. 1 is a side view in cross-section of an electrical transformer insulated with a resin cured with the catalyst of of the invention; and FIG. 2 is a cross-sectional view of a laminate formed by bonding together two sheets of a suitable material by an adhesive comprised of a resin cured with the catalyst of this invention.

Broadly, in the attainment of the foregoing objects and in accordance with this invention, there is provided a process for preparing nitrogen coordinated boron compounds which comprises admixing a monoalkanolamine and a boron compound selected from the group consisting of boric acid and esters of boric acid, heating the admixture at elevated temperatures until the reaction is complete, and recovering the nitrogen coordinated boron compound reaction product. Water is an additional reaction product if boric acid is used as one of the reactants, and an alcohol is an additional reaction product when an ester of boric acid is used as a reactant.

In preparing the nitrogen coordinated boron compounds of this invention there are employed about three mols of a monoalkanolamine for each mol of boron compound employed in reaction therewith.

Monoalkanolamines employed in this invention are those that have the formula

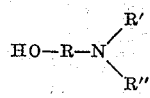

wherein R is selected from the group consisting of —$CH_2$—$CH_2$— (the ethylene radical) and

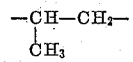

(the isopropylene radical).

R' and R" are selected from the group consisting of hydrogen; alkyl radicals including, for example, methyl, ethyl, propyl, isopropyl, n-butyl, sec-butyl, t-butyl, pentyl and hexyl; cycloalkyl radicals including, for example, cyclopentyl and cyclohexyl; and aryl radicals including, for example, phenyl, benzyl, methyl phenyl, dimethyl phenyl, chloro phenyl, and dichlorophenyl.

Specific examples of monoalkanolamines that can be employed in carrying out this invention include monoethanolamine, mono-isopropanolamine, N-methyl ethanolamine, N,N-dimethyl ethanolamine, N-methyl isopropanolamine, N,N-dimethyl isopropanolamine, N-ethyl ethanolamine, N,N-diethyl ethanolamine, N,N-diethyl isopropanolamine, N-phenyl ethanolamine, N,N-diphenyl ethanolamine, N,N-diphenyl isopropanolamine, N,N-diisopropyl ethanolamine and N,N-di(2-ethylhexyl) ethanolamine.

The boron compound employed in this invention can be boric acid or the esters of boric acid. The esters of boric acid are referred to in the art as borates and are well known in the art. The borates include those materials having the structural formula

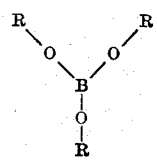

wherein R can be an alkyl radical including, for example, methyl, ethyl, propyl, isopropyl, n-butyl, isobutyl, pentyl, and hexyl; a cycloalkyl radical including, for example, cyclopentyl and cyclohexyl; and an aryl radical including, for example, benzyl, phenyl, methyl-phenyl, dimethyl phenyl and halogenated phenyl radicals such as chlorophenyl. Two or three different radicals can be present on a single borate.

Specific examples of borates that can be employed in carrying out this invention include ethyl borate, methyl borate, n-propyl borate, n-butyl borate, cyclohexyl borate, tri-o-cresyl borate, tri-m-cresyl borate, tri-m,p-cresyl borate, phenyl borate, benzyl borate, and isopropyl borate.

In preparing the nitrogen coordinated boron compounds of this invention the desired amounts of reactants are placed in a suitable reaction vessel where the reactants are thoroughly admixed and heated to an elevated temperature of the order of about 60° C. to 140° C., and maintained at this temperature until reaction is complete. The water or alcohol reaction product formed can be removed conveniently during heating by means of distillation. The time required for the reaction to be complete will usually be from about 4 hours to 8 hours and longer depending on the amount of reactants employed.

When boric acid is employed as one of the reactants in carrying out the process of this invention, it has been found desirable to employ in admixture with the reactants at least 5% by weight, based on the total weight of the reactants, of an inert solvent that will form an azeotropic mixture with the water reaction product to insure substantial removal thereof from the reaction vessel. Examples of suitable azeotropisers that can be employed are benzene, toluene, xylene, and mixtures of two or more. Any azeotropiser remaining in the reaction vessel after the reaction has been completed is distilled off by heating under reduced pressure.

Nitrogen coordinated boron compounds of this invention have the structural formula

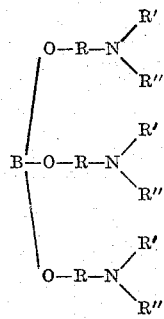

wherein R is selected from the group consisting of $$-CH_2-CH_2-$$

and $$-CH-CH_2- \\ \phantom{-}|\phantom{CH_2-} \\ \phantom{-}CH_3$$

and R' and R'' are selected from the group consisting of hydrogen, alkyl radicals, aryl radicals, and cycloalkyl radicals.

The following specific examples are illustrative of the preparation of the nitrogen coordinated boron compounds of this invention.

Example I

Into a reaction vessel fitted with stirrer, thermometer and fractionating column there are introduced about 3 mols of monoethanolamine and about 1 mol of methyl borate to provide a mixture. The mixture is heated slowly to about 110° C. The mixture is maintained at this temperature until substantially all the methanol reaction product (about 3 mols) formed during the reaction is removed by distillation through the fractionating column. A white solid having a wax-like appearance is then recovered from the reaction vessel by distillation under a vacuum of about 4 mm. of mercury and at a temperature of about 120° C. The solidified distillation product has a melting point of from about 30° C. to 32° C. This product is tri[2-aminoethanol] borate and can be represented by the structural formula

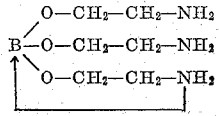

Example II

Into a reactional vessel fitted with stirrer, thermometer and fractionating column there are introduced about 3 mols of monoisopropanolamine, about 1 mol of boric acid, and about 1 liter of benzene to provide a mixture. The reactants are admixed thoroughly and heated slowly to about 110° C. This temperature is maintained until substantially all the water, one of the reaction products, is removed by azeotropic distillation. The azeotropic mixture of water and benzene has a boiling point of about 69° C. The reaction product remaining in the reaction vessel is recovered by distillation under vacuum in the same manner as that in Example I. This product is tri[2-aminoisopropanol] borate and can be represented by the structural formula

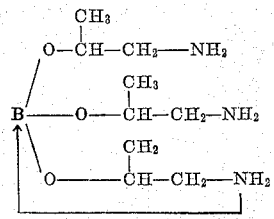

Example III

Into a reaction vessel fitted with attachments employed in Example I there are introduced about 3 mols of N-methyl ethanolamine and about 1 mol of ethyl borate. The reactants are admixed and heated slowly to a temperature of about 115° C. The mixture is maintained at this temperature until substantially all the ethanol (about 3 mols) formed during the reaction is removed by distillation through the fractionating column. The reaction product remaining in the reaction vessel is tri[2-methylaminoethanol] borate and can be represented by the structural formula

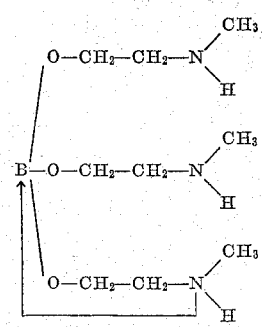

The reaction product is recovered from the reaction vessel by distillation under a vacuum of about 4 mm. of mercury and at a temperature of about 89 to 92° C. The reaction product is a colorless liquid.

Example IV

Into a reaction vessel fitted with stirrer, thermometer, and fractionating column there are introduced about 3 mols of N,N-dimethyl ethanolamine and about 1 mol of trimethyl borate. The reactants are thoroughly admixed and heated slowly to a temperature of about 115° C. The mixture is maintained at this temperature until substantially all of the methanol (about 3 mols) formed during the reaction is removed by distillation through the fractionating column. A clear liquid is recovered from the reaction vessel by distillation under a vacuum of about 4 mm. of mercury and at a temperature of about 134° C. This product is tri[2-dimethylaminoethanol] borate and can be represented by the structural formula

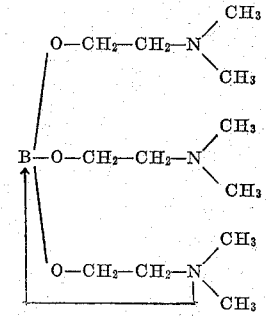

Example V

The process of Example IV is repeated with the exception that about 3 mols of N,N-diethyl ethanolamine are used in place of the N,N-dimethyl ethanolamine.

The product of this reaction is tri[2-diethylaminoethanol] borate and can be represented by the structural formula

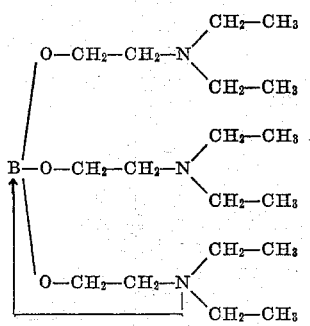

*Example VI*

Into a reaction vessel fitted with the attachments employed in Example I there are introduced about 3 mols of N,N-dimethyl ethanolamine and about 1 mol of tri-isopropyl borate. The mixture is agitated and heated to about 115° C. This temperature is maintained until about 3 mols of isopropanol are removed by distillation. The reaction product remaining in the reaction vessel is tri[2-dimethylethanolamine] borate.

The nitrogen coordinated boron compounds of this invention are adapted particularly for use as curing catalysts or curing agents for glycidyl polyethers, also referred to in the art as epoxy or epoxide resins.

Glycidyl polyethers have excellent chemical resistance, low moisture permeability and superior adhesive properties all of which make said resins particularly well suited for use as adhesive sealing compounds, casting resins, and surface coatings.

Generally, glycidyl polyethers are cured to hard, thermoset resins by heating the same in the presence of certain well known catalysts or curing agents. Some disadvantages have resulted from the use of many of the prior art curing catalysts.

The nitrogen coordinated boron compounds of this invention when employed as a catalyst or curing agent for glycidyl polyethers have produced cured hard resins having properties superior in many respects to the properties of hard, cured epoxy resins resulting from the use of prior art curing catalysts. The amount of nitrogen coordinated boron compound employed as a curing catalyst can be varied from about 0.5% to 50% by weight based on the weight of the glycidyl polyether with good results, however, the preferred range is from about 2% to 25%.

The epoxide resins can be prepared by reacting predetermined amounts of at least one polyhydric phenol and at least one epihalohydrin in an alkaline medium. Phenols that are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges such, for example, as 4,4'-dihydroxy-diphenyl-dimethyl-methane (referred to hereinafter as bisphenol "A") and 4,4'-dihydroxy-diphenyl-methane. In admixture with the named polynuclear phenols, use also can be made of those polynuclear phenols wherein the phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide starting materials of the present invention, other epihalohydrins such as epibromohydrin and the like also can be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, can be employed although it is preferred to use sodium hydroxide since it is relatively inexpensive.

The resinous polymeric epoxide suitable for use in this invention has a 1,2-epoxy equivalency greater than 1.0. By epoxy equivalency reference is made to the number of 1,2-epoxy groups contained in the average molecule of the glycidyl ether.

Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers thus is a value between 1.0 and 2.0. In other cases, the epoxide equivalency is given in terms of epoxide equivalents in 100 grams of the resins, and this can vary from about 0.019 to 1.5. Also, epoxide equivalent is often expressed as the number of grams of resin containing one equivalent of epoxide.

Resinous polymeric epoxides or glycidyl polyethers suitable for use in accordance with this invention can be prepared by admixing and reacting from one mol to 2 mols proportions of epihalohydrin, preferably epichlorohydrin, with about one mole proportion of bisphenol "A" in the presence of at least a stoichiometric excess of alkali based on the amount of halogen.

To prepare the resinous polymeric epoxides, aqueous alkali, bisphenol "A" and epichlorohydrin are introduced into and admixed in a reaction vessel. The aqueous alkali serves to dissolve the bisphenol "A" with the formation of the alkali salts thereof. If desired, the aqueous alkali and bisphenol "A" can be admixed first and then the epichlorohydrin added thereto, or an aqueous solution of alkali and bisphenol "A" can be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, can be employed during the washing procedure to neutralize the excess alkali. The resulting epoxy resins can be liquid or solid at room temperature, depending upon proportions of reactants employed.

Various epoxy resins have given good results. Thus, the following specific resins and mixtures of two or more can be used with success.

*Example VII*

An epoxide resin having a melting point of 8–12° C., an epoxide equivalency of 190 to 210, and a viscosity of Z–5 to Z–6+ on the Gardner-Holdt scale gives good results. This resin is available commercially as Epon 828.

*Example VIII*

An epoxide resin having a melting point of 64–67° C., an epoxide equivalency of 450 to 525, and a viscosity of C–G on the Gardner-Holdt scale (as a 40% solution in butyl Carbitol) gives good results. This epoxy resin is commercially available as Epon 1001.

*Example IX*

An epoxide resin having a melting point of 97–103° C., an epoxide equivalency of 905 to 985, and a viscosity of R–T on the Gardner-Holdt scale (as a 40% solution in butyl Carbitol) has given good results. This resin is available commercially as Epon 1004.

*Example X*

An epoxide resin having a melting point of about 11° C. to 15° C., a specific gravity (23° C./23° C.) of from 1.16 to 1.18, and an epoxy value of from 0.440 to 0.480 epoxide equivalents per 100 grams of resin, and a viscosity of Z–6 on the Gardner-Holdt scale gives good results. This resin is available commercially as Araldite 6020.

The epoxide resin, whether solid or liquid, is usually dissolved in a volatile solvent when it is desired to produce a low viscosity epoxy resin impregnating composition. Suitable solvents for epoxy resins include acetone, ethanol, methyl ethyl ketone, toluol, xylol, methyl Cellosolve, butyl Carbitol and mixtures of two or more.

*Example XI*

A mixture of 100 parts by weight of the glycidyl polyether of Example X and about 10 parts by weight of the nitrogen coordinated boron compound of Example I are admixed. The resultant mixture gelled in 3 hours at 100° C., in 1¾ hours at 135° C., and in 1¾ at 150° C. The mixture had a pot life of about 6 days.

*Example XII*

A mixture of 100 parts by weight of the glycidyl polyether in Example X and about 5 parts by weight of the nitrogen coordinated boron compound of Example III were admixed. The resultant mixture gelled in 75 minutes at 80° C., in 35 minutes at 100° C., in 18 minutes at 135° C., and in 15 minutes at 150° C.

*Example XIII*

A mixture of 100 parts by weight of the glycidyl polyether of Example X and about 8 parts by weight of the nitrogen coordinated boron compound of Example III were admixed. The resultant mixture gelled in 30 minutes at 80° C., in 13 minutes at 100° C., in 9 minutes at 135° C., and in 6 minutes at 150° C.

*Example XIV*

A mixture of 100 parts by weight of the glycidyl polyether of Example X and about 8 parts of the nitrogen coordinated boron compound of Example IV were admixed. The resultant mixture gelled in 10 minutes at 80° C., in 5 minutes at 100° C., in 5 minutes at 135° C., and in 4 minutes at 150° C.

It is a particularly important feature of this invention that when the catalyzed glycidyl polyether mixture is subjected to elevated temperatures of from about 100° C. to 200° C. and higher, the catalysts and polyether react readily to form a hard, tough, cured resinous product. Such cured resinous products exhibit low electrical losses up to about 150° C.

Glycidyl polyethers catalyzed with the curing catalyst mixture of this invention are particularly suitable for electrical insulating applications. Thus, solutions of the glycidyl polyethers and curing catalysts can be applied to electrical wires, cables, coils, windings, and the like as potting, impregnating and coating resins and varnishes. Upon being subjected to heat, any solvent which may be present in the polyether-curing catalyst mixtures evaporates and the liquid polyether cures to a hard, tough, resinous mass. These catalyzed glycidyl polyether compositions can be employed also for potting and casting applications. Laminated magnetic cores, for example, can be dipped in such liquid compositions, using vacuum and pressure as necessary, and the compositions will readily fill all of the spaces between the laminations. On heating, the composition between the laminations cures to a hard, tough, adhesive binder holding the laminations in position to produce a solid core which is extremely resistant to delamination and can be cut to core segments without rupture. Electrical transformers, rectifiers and electronic components of various kinds can be potted or coated with the completely reactive glycidyl polyether compositions of this invention.

The compositions comprising the epoxy resins and the curing catalysts of this invention are excellent adhesives. Thin coatings can be applied to metal, wood, porcelain, paper, plastics such as phenolic laminates, and when the coated surfaces are superimposed under moderate pressures and heated to temperatures of from about 100° C. to 200° C., unusually good bonds are obtained. Glycidyl polyethers which are cured using the catalysts of this invention can be admixed with solids such as silica, titania, glass fibers, wood flour, zirconia, graphite, and calcium silicate. In some instances, small amounts of up to 50% of the weight of the composition of other resins such as phenolics, polyesters, glycol maleates and alkyd resins, can be admixed with the glycidyl polyethers in the practice of this invention. In order to indicate more specifically the advantages and capabilities of the curing catalysts of this invention, the following example is given.

*Example XV*

A transformer is impregnated with a quantity of the catalyzed polyether mixture prepared as described in Example XIV. The catalyzed polyether mixture is applied to the transformer in an impregnation tank under pressure. After curing at a temperature of about 135° C. for about 3 hours and 3 hours at 120° C., the transformer was completely impregnated with the tough, hard resin having excellent electrical insulating properties.

The glycidyl polyether-catalyst mixtures of this invention are useful as casting resins, mica bond surface coatings, moldings, adhesives, sealants, resin products generally, and insulation for all kinds of electrical equipment.

Referring to FIG. 1 of the drawing there is shown a transformer 10 comprising a core 12 comprised of any suitable metal, steel for example, a coil 14 comprised of a suitable metal conductor such as copper, silver, aluminum or the like, and resinous insulation 16 comprising the heat hardened glycidyl polyether resin cured by heating in the presence of the catalyst of this invention. Connections are made to the transformer through metal contacts 18 which pass from the coil 14 through the resinous insulation 16.

Referring to FIG. 2 of the drawing there is shown a laminated article of manufacture 20 comprised of two sheets of electrical insulating material 22, kraft paper for example, bonded together by a layer 24 of adhesive comprised of the catalyzed glycidyl polyether resin of this invention.

It is to be understood that the above description is illustrative of this invention and not in limitation thereof.

I claim as my invention:

1. A composition of matter comprising an intimate admixture of (1) of a reactive glycidyl polyether and (2) a curing catalyst therefor comprising from 0.5% to 50% by weight, based on the weight of the polyether, of a nitrogen coordinated boron compound having the structural formula

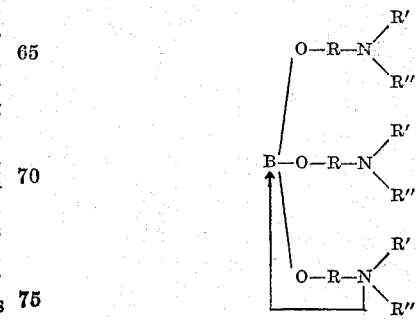

wherein R is selected from the group consisting of

and

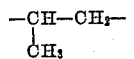

and R' and R" are selected from the group consisting of hydrogen, alkyl radicals, cycloalkyl radicals, and aryl radicals.

2. A composition of matter comprising an intimate admixture of (1) a reactive glycidyl polyether and (2) a curing catalyst therefor comprising from 0.5% to 50% by weight, based on the weight of the polyether, of a nitrogen coordinated boron compound having the structural formula

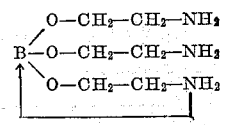

3. A composition of matter comprising an intimate admixture of (1) a reactive glycindyl polyether and (2) a curing catalyst therefor comprising from 0.5% to 50% by weight, based on the weight of the polyether, of a nitrogen coordinated boron compound having the structural formula

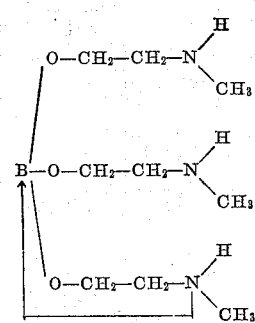

4. A composition of matter comprising an intimate admixture of (1) a reactive glycidyl polyether and (2) a curing catalyst therefor comprising from 0.5% to 50% by weight, based on the weight of the polyether, of a nitrogen coordinated boron compound having the structural formula

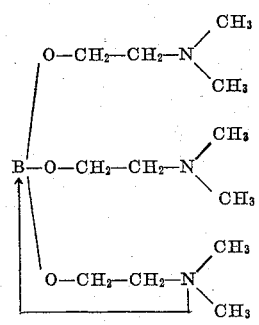

5. A composition of matter comprising an intimate admixture of (1) a reactive glycidyl polyether and (2) a curing catalyst therefor comprising from 0.5% to 50% by weight, based on the weight of the polyether of a nitrogen coordinated boron compound having the structural formula

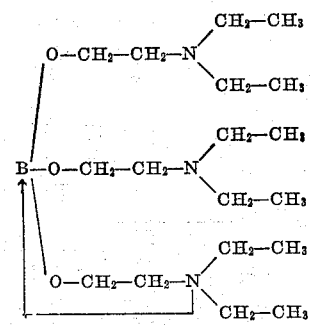

6. The process of producing a hard, cured resinous product which comprises admixing a glycidyl polyether with from 0.5% to 50% by weight, based on the weight of the polyether, of at least one nitrogen coordinated boron compound having the formula

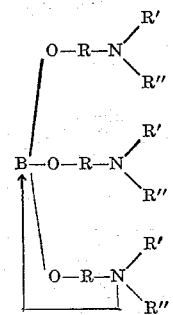

wherein R is selected from the group consisting of

−CH₂−CH₂− and

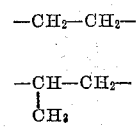

and R' and R" are selected from the group consisting of hydrogen, alkyl radicals, cycloalkyl radicals, and aryl radicals, and heating the mixture within the range of from about 80° C. to 150° C.

7. An insulated electrical member comprising an electrical conductor and cured, resinous insulation applied to the conductor, the resinous insulation comprising the heat reaction product of a glycidyl polyether and from 0.5% to 50% by weight, based on the weight of the polyether, of a nitrogen coordinated boron compound having the formula

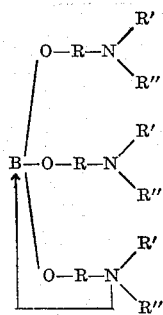

wherein R is selected from the group consisting of

−CH₂−CH₂− and

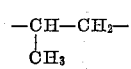

and R' and R" are selected from the group consisting of hydrogen, alkyl radicals, cycloalkyl radicals, and aryl radicals.

8. An insulated electrical member comprising an electrical conductor and cured, resinous insulation applied to the conductor, the resinous insulation comprising the heat reaction product of a glycidyl polyether and from 0.5% to 50% by weight, based on the weight of the polyether, of a nitrogen coordinated boron compound having the formula

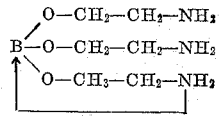

9. An insulated electrical member comprising an electrical conductor and cured, resinous insulation applied to the conductor, the resinous insulation comprising the heat reaction product of a glycidyl polyether and from 0.5% to 50% by weight, based on the weight of the polyether, of a nitrogen coordinated boron compound having the formula

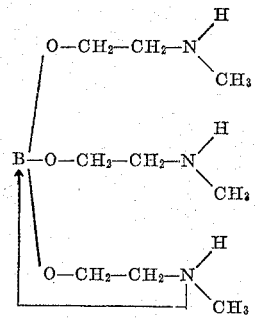

10. An insulated electrical member comprising an electrical conductor and cured, resinous insulation applied to the conductor, the resinous insulation comprising the heat reaction product of a glycidyl polyether and from 0.5% to 50% by weight, based on the weight of the polyether, of a nitrogen coordinated boron compound having the formula

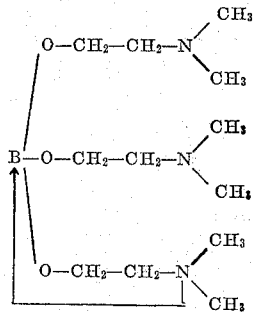

11. An insulated electrical member comprising an electrical conductor and cured, resinous insulation applied to the conductor, the resinous insulation comprising the heat reaction product of a glycidyl polyether and from 0.5% to 50% by weight, based on the weight of the polyether, of a nitrogen coordinated boron compound having the formula

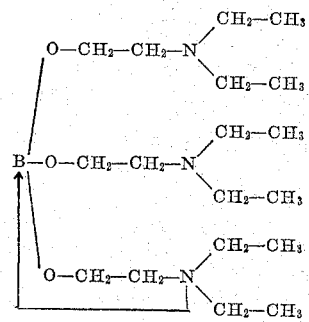

References Cited in the file of this patent

UNITED STATES PATENTS

| | | |
|---|---|---|
| 2,259,175 | Paul | Oct. 14, 1941 |
| 2,441,063 | Gilmann | May 4, 1948 |
| 2,769,840 | Sowa | Nov. 6, 1956 |
| 2,785,192 | Elbling et al. | Mar. 12, 1957 |
| 2,871,454 | Langer | Jan. 27, 1959 |
| 2,941,981 | Elbling et al. | June 21, 1960 |
| 2,957,840 | Groszos et al. | Oct. 25, 1960 |
| 2,970,130 | Finestone | Jan. 31, 1961 |

OTHER REFERENCES

Thomas: "The Preparation of Simple Organic Orthoborates"; J. Chem. Soc., 1946, pp. 820–822.

Langer et al.: Ind. and Eng. Chem., vol 49, No 7, July 1957; pages 1113–1114.